Aug. 26, 1958     D. L. HANNA     2,849,500
PURIFICATION OF 1,2,4,5-TETRACHLOROBENZENE BY PRESSING
Filed Oct. 4, 1955
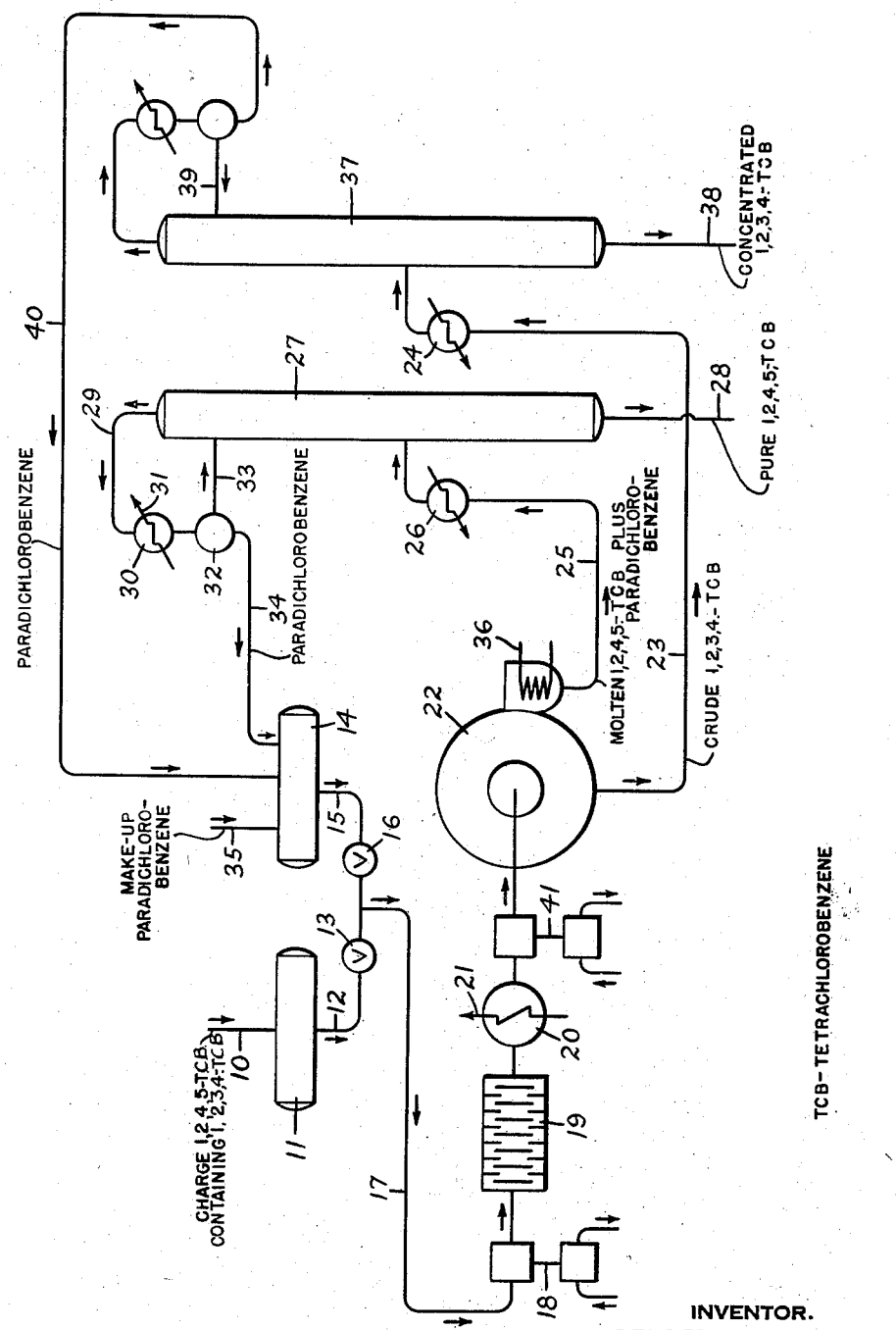
INVENTOR.
DELBERT L. HANNA
BY
AGENT.

United States Patent Office 2,849,500
Patented Aug. 26, 1958

2,849,500

PURIFICATION OF 1,2,4,5-TETRACHLORO-BENZENE BY PRESSING

Delbert L. Hanna, Oak Park, Ill., assignor to Allied Chemical Corporation, New York, N. Y., a corporation of New York Application October 4, 1955, Serial No. 538,331

6 Claims. (Cl. 260—650)

This invention relates to improvements in purification of 1,2,4,5-tetrachlorobenzene.

According to processes heretofore known to those skilled in the art, tetrachlorobenzenes have been prepared, either as desired products or as by-product of liquid phase chlorination of benzene, monochlorobenzene, dichlorobenzenes, or trichlorobenzenes (e. g. 1,2,4-trichlorobenzene). Typically the recovery operations have included one or more distillation steps wherein the various lighter components (and the heavier components, if present) have been separated to yield an essentially pure tetrachlorobenzene fraction. This fraction typically contains say 40% to 70%, 1,2,4,5-tetrachlorobenzene (M. P. 139.7° C.) and 60% to 30% 1,2,3,4-tetrachlorobenzene (M. P. 46.5° C.). Minor to negligible amounts of 1,2,3,5-tetrachlorobenzene (M. P. 50.48° C.) may also be present.

Although each of these solids has a melting point substantially above room temperature of e. g. 20° C.–30° C., they form an eutectic composition (containing 89% of 1,2,3,4-tetrachlorobenzene and 11% of 1,2,4,5-tetrachlorobenzene) which has a melting point of 39° C., which may be lower than the temperature at which the tetrachlorobenzene fraction is delivered from recovery equipment. The mixture of tetrachlorobenzenes may be obtained for processing in accordance with the invention as a liquid, or as a solid, or as a slurry.

When the tetrachlorobenzene fraction has been separated from other chlorinated benzene products by crystallization, fractional or otherwise, from any one of various solvents including, for example, benzene, the tetrachlorobenzene fraction as presented for practice of the invention may include such solvent. The term "crude 1,2,4,5-tetrachlorobenzene" is hereinafter applied to the charge mixture of tetrachlorobenzenes containing 1,2,4,5-tetrachlorobenzene and 1,2,3,4-tetrachlorobenzene, whether that mixture is in liquid form, in slurry form, or in apparently solid or crystalline form and including those mixtures having solvent present. The term "mother liquor" is hereinafter employed to designate all impurities present with the 1,2,4,5-tetrachlorobenzene, including e. g. the 1,2,3,4-tetrachlorobenzene, the mixture of paradichlorobenzene with 1,2,4,5-tetrachlorobenzene and 1,2,3,4-tetrachlorobenzene, and/or orthodichlorobenzene or solvent (if any) present, which may be separated from the crystals of 1,2,4,5-tetrachlorobenzene by the process of this invention.

If crude 1,2,4,5-tetrachlorobenzene crystals, in any of the forms hereinbefore referred to, were filtered in order to attempt to separate therefrom accompanying mother liquor, it would be found that the filter cake retained an undue amount of liquor, thus decreasing efficiency of the purification. This tendency is not overcome by the use of modern pressure filters in which the cake is subjected to substantial pressure. Failure of filtration to remove satisfactorily liquor from the crystals is attributed to the facts that the crystals form a filter cake structure having a considerable volume of interstitial spaces or voids and that the crystals are not sufficiently deformed under the pressure utilized in filtration to fill the spaces therebetween, with the result that the liquor is retained in the spaces and is not expressed from the cake.

It is an object of the present invention to provide an improved process for filtration of 1,2,4,5-tetrachlorobenzene, which process results in attainment of a filter cake of lower liquor content than filtration processes heretofore known.

This invention is carried out by forming a mixture of crude 1,2,4,5-tetrachlorobenzene crystals with crystals of paradichlorobenzene and subjecting the resultant mixture of crystals to pressure, preferably by filter pressing. Although the scope of this invention is not intended to be restricted by the theory, it is believed that the desirable results produced are obtained, at least in part, because the paradichlorobenzene crystals are more easily deformable under pressure than 1,2,4,5-tetrachlorobenzene crystals. Accordingly, when a mixture of the two types of crystals is subjected to pressure, the paradichlorobenzene crystals tend to flow and fill the interstices between the 1,2,4,5-tetrachlorobenzene crystals and displace liquor which would remain in the filter cake if the paradichlorobenzene were not present. Since paradichlorobenzene boils at a considerably lower temperature (B. P. about 174° C.) than 1,2,4,5-tetrachlorobenzene (B. P. about 246° C.), the paradichlorobenzene may be readily separated from the tetrachlorobenzene by distillation.

The crude charge 1,2,4,5-tetrachlorobenzene may be in completely liquid state e. g. if it is at high temperature and/or if there is present a high percentage of 1,2,3,4-tetrachlorobenzene; it may be in completely solid form if it is at low temperature and/or if there is present a high percentage of 1,2,4,5-tetrachlorobenzene; it may be in the form of slurry of solid crystalline 1,2,4,5-tetrachlorobenzene in a liquid containing a mixture of 1,2,4,5-tetrachlorobenzene and 1,2,3,4-tetrachlorobenzene. If the temperature is below 39° C., there may be present crystals of the eutectic containing 89% of 1,2,3,4-tetrachlorobenzene and 11% of 1,2,4,5-tetrachlorobenzene. There may also be present a minor proportion of a recrystallization solvent e. g. benzene, when the tetrachlorobenzene fraction has been purified by crystallization therefrom.

The proportion of paradichlorobenzene to 1,2,4,5-tetrachlorobenzene may be varied widely. Although the paradichlorobenzene may be present in amount at least sufficient to fill substantially the interstices between the 1,2,4,5-tetrachlorobenzene crystals, which spaces in one case amounted to about 29% of the apparent volume, there should be present an amount of it above that which forms within the mass of solid 1,2,4,5-tetrachlorobenzene crystals a ternary liquid mixture of paradichlorobenzene, 1,2,4,5-tetrachlorobenzene, and 1,2,3,4-tetrachlorobenzene. In order to obtain a filter cake of minimum liquid content, paradichlorobenzene will preferably be added to the mixed tetrachlorobenzenes in amount of the order of at least 30 parts by weight of the former for each 100 parts by weight of the latter. It will be appreciated that the advantages of the invention may be realized in part by utilizing smaller amounts of the dichlorobenzene. Under these conditions a filter cake will be obtained which contains lower liquid content than would be the case if no dichlorobenzene were added. Although paradichlorobenzene may be added in amounts greater than above indicated, since it is ordinarily desirable to separate this compound from the resultant filter cake by distillation, use of only the amount thereof sufficient to obtain filter cake of the desired liquid content minimizes the distillation necessary for separation. Ordinarily from 100 to 200 parts by weight of paradichlorobenzene per 100 parts by weight of 1,2,4,5-tetrachlorobenzene represents preferred proportions of these materials in the filter cake in which case the filter cake contains low quantities of residual mother liquor as 2% or less. Paradichlorobenzene may contain substantial amounts of orthodichlorobenzene and other impurities, and the term "paradichlorobenzene" as used herein is intended to include such impure forms as well as the pure material.

Although the paradichlorobenzene and the crude tetrachlorobenzenes may each be in solid form or preferably in completely molten or liquid form when mixed, the temperature after mixing will be modified, as hereinafter described in detail, to insure that paradichlorobenzene and the 1,2,4,5-tetrachlorobenzene are present as solid crystals. Under preferred conditions, the temperature after mixing will be such that these crystals are present in a slurry containing in the liquid phase, a mixture of paradichlorobenzene, 1,2,4,5-tetrachlorobenzene and 1, 2,3,4-tetrachlorobenzene. Mixing may be effected e. g. by precipitation of paradichlorobenzene and the mixed tetrachlorobenzenes from common solvent e. g. benzene or monochlorobenzene.

The temperature at which filtration is conducted should be below the melting point of paradichlorobenzene; subject to maintenance of the paradichlorobenzene in solid state during filtration, the temperature may be varied over a wide range; ordinary atmospheric temperature may be conveniently employed. The filtration should be carried out under pressure of at least 200 and preferably 1000 lbs. per square inch in order to promote the desired deformation and flowing of the paradichlorobenzene crystals so as to fill or partially fill the interstices between the tetrachlorobenzene crystals.

The drawing represents schematically one specific embodiment of this process and illustrates the production of substantially pure 1,2,4,5 - tetrachlorobenzene. Reaction mixture comprising crude charge 1,2,4,5-tetrachlorobenzene either in molten form or in slurry form in the presence of a liquid containing the same together with 1,2,3,4-tetrachlorobenzene, is passed through line 10 to vessel 11 wherein it may be temporarily retained before further treatment. This mixture is withdrawn through line 12 and metering valve 13. It is contacted at the junction point of lines 12 and 15 with line 17, with paradichlorobenzene preferably in molten form or as slurry of crystals (e. g. in benzene), which is withdrawn from storage vessel 14 through line 15 and valve 16. Crude paradichlorobenzene may be used, such, for example, as may contain up to 20% or more of orthodichlorobenzene. In this event, the mixture may be a slurry of solid paradichlorobenzene in a liquid comprising orthodichlorobenzene. When crude paradichlorobenzene is employed rather than the pure material, the former may be substituted on a basis of equal paradichlorobenzene crystal content at the pressing temperature.

Low pressure pump 18 forces the mixture containing 1,2,3,4 - tetrachlorobenzene, 1,2,4,5 - tetrachlorobenzene, and paradichlorobenzene through mixer 19 wherein alternate plates and orifices thoroughly complete the mixing. This mixing step is especially advantageous if both the tetra- and dichloro-compounds are present as liquids or as a slurry of crystals. The mixture, if it is not sufficiently cool to insure the presence of both the 1,2,4,5-tetrachloro- and paradichloro compounds in crystalline form, is cooled in cooler 20 through which refrigerant flows through line 21, to a temperature of preferably from about 18° C. or slightly below up to about 32° C. If the system being purified consists solely of 1,2,4,5-tetrachlorobenzene, 1,2, 3,4-tetrachlorobenzene, and paradichlorobenzene, the lower temperature limit of operation is that of the ternary eutectic at about 15° C.

The cooled crystalline mixture is compressed in high pressure pump 41 to a pressure of at least 200 p. s. i. and preferably greater than 1,000 p. s. i., say 1350 p. s. i., and passed to filter press 22, schematically indicated. The high pressure pump 41 and filter 22 in combination, are intended to schematically indicate filtration under pressure in a continuous operation. It may not always be necessary to have a separate pump 41 in the system, the high pressure being obtained by the filter press. One specific type of filter press adapted to be used in combination with this invention, is that commercially identified as a "Carver" press. This press, which is adapted to high pressure operation, consists of a squat cylindrical shell of sufficient thickness to withstand high pressure. Circumferentially spaced around the perimeter of the cylinder is a plurality of attenuated slots which preferably extend generally parallel to the main axis thereof. Fitted within the cylinder is a piston which is adapted to move inside the cylinder.

When filtering in this embodiment, the crystalline mixture is placed within the cylinder upon the piston, and the head is inserted into the end of the cylinder and securely affixed in place by securing means. The piston is forced up by means sufficient to give the desired operating pressure of about 1350 p. s. i. g. for example. As the piston rises it compresses the mixture, and the deformable crystals of paradichlorobenzene flow under the effect of the pressure to displace the mother liquor from between the rigid crystals of 1,2,4,5-tetrachlorobenzene. The displaced mother liquor, containing the 1,2,3,4-tetrachlorobenzene and some paradichlorobenzene and, if present, orthodichlorobenzene, passes from the filter cake through the slits to the outside of the cylinder to be recovered. The piston is then withdrawn, the head removed, and the crystalline mixture further treated. When using this particular type of press, an extra pump such as the pump 41 shown in the drawing, is not required. Any type of filter press giving the required high pressure may be employed.

The filtrate, whether the filtration operation is conducted schematically as shown in the drawing or in the specific embodiment described, is withdrawn from the filter through line 23. It contains substantially all of the 1,2,3,4-tetrachlorobenzene present in the original reaction mixture, some paradichlorobenzene and, if present, orthodichlorobenzene, and also some 1,2,4,5-tetrachlorobenzene. The 1,2,4,5-tetrachlorobenzene may be present in amounts up to 5%–10%, depending on the temperature of filtration. To separate paradichlorobenzene therefrom, the filtrate in line 23 is heated in exchanger 24 and distilled in tower 37 which contains reflux circuit 39. The net overhead, substantially pure paradichlorobenzene and orthodichlorobenzene, if present, is recycled through line 40 to vessel 14. Bottoms from tower 37 in line 38 are 1,2,3,4-tetrachlorobenzene of high concentration along with lesser quantities of 1,2,4,5-tetrachlorobenzene.

The filter cake, recovered from filter 22, contains paradichlorobenzene and the 1,2,4,5-tetrachlorobenzene which was in the slurry in the line 17. It may contain, depending upon the quantity of paradichlorobenzene employed, not more than 1%–2% or less of the mother liquor. Filtration of 1,2,4,5-tetrachlorobenzene crystals in the absence of paradichlorobenzene but under otherwise similar conditions, results in a filter cake containing as much as 29% of mother liquor, even at filter pressure of about 1350 lbs. per square inch.

This cake is melted by means of steam coils 36 and moved through line 25 for heating in heat exchanger 26 with steam or other medium, and distilled or flashed off in column 27 which may desirably have several decks or plates (not shown). The bottoms from this flashing, 1,2,4,5-tetrachlorobenzene preferably of greater than 99% purity, are withdrawn through line 28. They are free of paradichlorobenzene, which is taken off as overhead through line 29.

The flashed-off paradichlorobenzene removed through line 29 is cooled to temperature above its melting point 53° C. and condensed in heat exchanger 30 to which water is passed through line 31. Condensate is collected in drum 32 and a portion thereof is returned through line 33 to tower 27, the remainder being withdrawn through line 34 and passed to vessel 14. Make up paradichlorobenzene is admitted to the system through line 35. Paradichlorobenzene may be withdraw from vessel 14 through line 15 preferably as a liquid.

*Example*

According to a specific example, the process of this invention was employed to treat 315 parts by weight of crude impure charge tetrachlorobenzenes which had been formed during liquid phase chlorination of benzene and subsequently recovered from the fractional distillation of the reaction effluent. The crude charge contained approximately 59% (186 parts) by weight of 1,2,4,5-tetrachlorobenzene and 41% (129 parts) by weight of 1,2,3,4-tetrachlorobenzene. This charge mixture was completely solid at 40° C. and completely liquid at and above 112° C. At charge temperature of 115° C. it was liquid.

In this example, the paradichlorobenzene employed was crude material containing approximately 81% by weight of the para-isomer (M. P. 53° C.) and 19% by weight of the ortho-isomer (M. P. −17.5° C.). This mixture was completely liquid at and above 43° C. 470 parts by weight of this mixture (equivalent to approximately 380 parts of pure paradichlorobenzene and 90 parts of pure orthodichlorobenzene) were added in molten form at 45° C. to the crude liquid tetrachlorobenzenes at 115° C. The mixture was agitated until complete mixing was effected during which time it was cooled to 18° C.

This mixture, now in the form of a thick slurry was deposited within the cylinder and on the piston of a "Carver" press as hereinbefore described. The head was placed on the cylinder. The piston was forced up to give desired operating pressure of 1350 p. s. i. g. The contents were maintained in the press for period of 45 minutes at full pressure.

As the pressing continued, mother liquor comprising 1,2,3,4 - tetrachlorobenzene, 1,2,4,5 - tetrachlorobenzene, orthodichlorobenzene, and paradichlorobenzene passed through the slits in the Carver press, while the cake containing 1,2,4,5-tetrachlorobenzene and paradichlorozene remained within the press. Analysis of the cake, after the mixture had been pressed for 45 minutes at 1350 p. s. i. g. revealed that it contained the following components:

| | Parts |
|---|---|
| 1,2,4,5-tetrachlorobenzene | 151.9 |
| Paradichlorobenzene | 218. |
| | 369.9 |

The mixture of paradichlorobenzene and 1,2,4,5-tetrachlorobenzene was distilled under atmospheric pressure. Overhead, at 174° C., was paradichlorobenzene of high purity. Bottoms of 1,2,4,5-tetrachlorobenzene was obtained in purity of 99+% at temperature of 250° C.

The mother liquor which had been pressed from the cake had the following composition:

| | Parts |
|---|---|
| 1,2,3,4-tetrachlorobenzene | 129 |
| Orthodichlorobenzene | 90 |
| Paradichlorobenzene | 162 |
| 1,2,4,5-tetrachlorobenzene | 34 |
| | 415 |

Although I have described one specific embodiment of this invention, it will be apparent to those skilled in the art that various modifications may be made which fall within the scope of this invention.

This application is a continuation-in-part of Serial No. 317,687, filed October 30, 1952, now abandoned.

I claim:

1. The process of recovering crystalline 1,2,4,5-tetrachlorobenzene from mixture thereof with liquor impurities comprising 1,2,3,4-tetrachlorobenzene which comprises incorporating crystalline paradichlorobenzene into said mixture, subjecting the resultant mixture of 1,2,4,5-tetrachlorobenzene and paradichlorobenzene crystals to pressure of at least 200 pounds per square inch whereby the paradichlorobenzene crystals deform, flow into, and at least partially fill the interstices between the crystals of 1,2,4,5-tetrachlorobenzene, and liquor impurities comprising 1,2,3,4-tetrachlorobenzene contained within the said interstices are displaced therefrom, and separating said displaced liquor impurities from said crystals of 1,2,4,5-tetrachlorobenzene and of paradichlorobenzene.

2. The process according to claim 1 in which the liquor impurities comprise a eutectic mixture of 1,2,3,4-tetrachlorobenzene and 1,2,4,5-tetrachlorobenzene.

3. The method of purifying crude 1,2,4,5-tetrachlorobenzene crystals containing 1,2,3,4-tetrachlorobenzene liquor impurity within the crystal interstices which comprises admixing solid paradichlorobenzene crystals with the crude 1,2,4,5-tetrachlorobenzene crystals, subjecting said mixture to pressure of at least 200 pounds per square inch whereby the paradichlorobenzene crystals deform, flow into, and at least partially fill the interstices between the crystals of 1,2,4,5-tetrachlorobenzene, and 1,2,3,4-tetrachlorobenzene liquor impurity contained within the said interstices is displaced therefrom, and separating said displaced liquor impurity from said crystals of 1,2,4,5-tetrachlorobenzene and of paradichlorobenzene.

4. The method of purifying crude 1,2,4,5-tetrachlorobenzene crystals containing liquor impurities within the crystal interstices as claimed in claim 3, which further comprises distilling the mixture of crystals of paradichlorobenzene and of 1,2,4,5-tetrachlorobenzene, recovering paradichlorobenzene as overhead from said distillation, and recovering pure 1,2,4,5-tetrachlorobenzene crystals as bottoms from said distillation.

5. The method of separating 1,2,4,5-tetrachlorobenzene from a mixture thereof with liquor impurities comprising 1,2,3,4-tetrachlorobenzene which comprises admixing paradichlorobenzene therewith, maintaining the resultant mixture at temperature within the range of +18° C. to 32° C. wherein paradichlorobenzene exists in the form of deformable crystals and said last-named mixture contains rigid crystals of 1,2,4,5-tetrachlorobenzene, subjecting last-named mixture to pressure greater than about 200 pounds per square inch whereby paradichlorobenzene crystals deform, flow into, and at least partially fill the interstices between the crystals of 1,2,4,5-tetrachlorobenzene and liquor impurities comprising 1,2,3,4-tetrachlorobenzene contained within the said interstices are displaced therefrom, and separating said displaced liquor impurities from said crystals of 1,2,4,5-tetrachlorobenzene and of paradichlorobenzene.

6. The method of separating crystalline 1,2,4,5-tetrachlorobenzene from a mixture of the same with liquor impurities comprising 1,2,3,4-tetrachlorobenzene which comprises admixing therewith crystalline paradichlorobenzene in amount of at least 30 parts by weight per 100 parts by weight of 1,2,4,5-tetrachlorobenzene, subjecting the resultant mixture to pressure of about 1350 pounds per square inch whereby paradichlorobenzene crystals deform, flow into, and at least partially fill the interstices between the crystals of 1,2,4,5-tetrachlorobenzene and liquor impurities comprising 1,2,3,4-tetrachlorobenzene contained within the said interstices are displaced therefrom, and separating said displacedt liquor impurities from the crystals of 1,2,4,5-tetrachlorobenzene and of paradichlorobenzene.

References Cited in the file of this patent
UNITED STATES PATENTS
1,934,675  Mills _____ Nov. 7, 1933